United States Patent [19]

Miller

[11] Patent Number: 5,112,394

[45] Date of Patent: * May 12, 1992

[54] FURNITURE POLISH CONCENTRATE AND FORMULATIONS

[75] Inventor: Eric J. Miller, Racine, Wis.

[73] Assignee: S.C. Johnson & Son, Inc., Racine, Wis.

[*] Notice: The portion of the term of this patent subsequent to Jun. 26, 2007 has been disclaimed.

[21] Appl. No.: 576,090

[22] Filed: Aug. 28, 1990

Related U.S. Application Data

[63] Continuation-in-part of Ser. No. 543,605, Jun. 25, 1990, abandoned, which is a continuation-in-part of Ser. No. 286,907, Dec. 20, 1988, Pat. No. 4,936,914.

[51] Int. Cl.⁵ ............................. C09G 1/10; C09D 3/2
[52] U.S. Cl. .................... 106/3; 106/287.16; 556/456
[58] Field of Search .......... 106/11, 3, 287.11, 287.14, 106/287.16; 556/456

[56] References Cited

U.S. PATENT DOCUMENTS

| | | | |
|---|---|---|---|
| 2,523,281 | 9/1949 | Currie . | |
| 2,584,413 | 2/1952 | Baer . | |
| 2,698,805 | 1/1955 | Currie et al. . | |
| 2,755,194 | 7/1956 | Volkmann et al. . | |
| 2,856,297 | 10/1958 | Geen . | |
| 2,868,657 | 1/1959 | Sesso . | |
| 2,907,664 | 10/1959 | Schoenholz et al. . | |
| 3,306,869 | 2/1967 | Lahr et al. | 260/24 |
| 3,341,338 | 9/1967 | Pater | 106/10 |
| 3,395,028 | 7/1968 | Mackles | 106/8 |
| 3,549,590 | 12/1970 | Holdstock et al. | 260/46.5 |
| 3,576,779 | 4/1971 | Holdstock et al. | 260/29.2 |
| 3,632,533 | 1/1972 | Winkler | 260/2.5 |
| 3,847,622 | 11/1974 | Brandl et al. | 106/10 |
| 3,856,533 | 12/1974 | Schnurrbusch et al. | 106/10 |
| 3,929,492 | 12/1975 | Chapman et al. | 106/3 |
| 3,956,174 | 5/1976 | Palcher | 252/400 R |
| 3,965,518 | 6/1976 | Muoio | 106/11 |
| 4,013,475 | 3/1977 | Liebowitz et al. | 106/10 |
| 4,113,677 | 9/1978 | Svedas et al. | 260/23 R |
| 4,163,673 | 8/1979 | Dechert | 106/11 |
| 4,217,396 | 8/1980 | Heckles | 428/500 |
| 4,218,250 | 8/1980 | Kasprzak | 106/3 |
| 4,265,663 | 5/1981 | Gilicinski et al. | 106/10 |
| 4,269,739 | 5/1981 | Grejsner | 252/547 |
| 4,273,584 | 6/1981 | D'Angelo et al. | 106/3 |
| 4,311,608 | 1/1982 | Maurice | 252/143 |
| 4,315,046 | 2/1982 | Frye | 427/322 |
| 4,354,871 | 10/1982 | Sutton | 106/3 |
| 4,404,035 | 9/1983 | Ona et al. | 106/271 |
| 4,462,828 | 7/1984 | Otsuki | 106/3 |
| 4,592,934 | 6/1986 | Wolstoncroft | 427/355 |
| 4,613,646 | 9/1986 | Sandvick | 524/476 |
| 4,732,612 | 3/1988 | Steer et al. | 106/10 |
| 4,936,914 | 6/1990 | Hurley et al. | 106/3 |

FOREIGN PATENT DOCUMENTS

| | | |
|---|---|---|
| 1224296 | 7/1987 | Canada . |
| 187077 | 3/1981 | Czechoslovakia . |
| 791605 | 3/1958 | United Kingdom . |
| 797263 | 6/1958 | United Kingdom . |
| 996657 | 6/1965 | United Kingdom . |
| 1162772 | 8/1969 | United Kingdom . |
| 1237080 | 6/1971 | United Kingdom . |
| 1313139 | 4/1973 | United Kingdom . |
| 1455199 | 11/1976 | United Kingdom . |

OTHER PUBLICATIONS

Isopar "Lubetext DG-1P", published 1983, by the Exxon Corporation of Houston, Tex.
Data Sheet "DG-1P" for Isopar C; 1979.
Data Sheet "DG-1P" for Iospar E; 1978.
Data Sheet "DG-1P" for Isopar G; 1978.
Data Sheet "DG-1P" for Isopar H; 1978.
Data Sheet "DG-1P" for Isopar K; 1978.
Data Sheet "DG-1P" for Isopar L; 1978.
Data Sheet "DG-1P" for Isopar M; 1978.
"Silicon Compounds, Register and Review" published 1987 by Petrarch Systems of Bristol, Pa., pp. 253-284.

*Primary Examiner*—William R. Dixon, Jr.
*Assistant Examiner*—Melissa Bonner

[57] ABSTRACT

A furniture polish concentrate is disclosed. Also disclosed is a furniture polish composition formulated from such a concentrate. The furniture polish concentrate comprises dimethyl silicone and a poly-(dimethyl)-copoly(methyl, oxygen-containing) siloxane copolymer, structurally depicted as

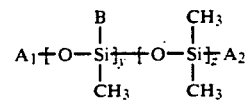

wherein "$A_1$" is Si—(—$CH_3$)$_3$; wherein "$A_2$" is O—Si—(—$CH_3$)$_3$; wherein "B" is $(CH_2)_i(M)_j(L)(CH_2CH_2O)_nR$; wherein "i" is either 0 or an integer value of 3 to 8 inclusive; wherein "j" is either 1 when "i" is 0 or is 0 when "i" is 3 to 8 inclusive; wherein "M" is

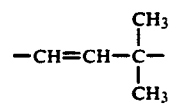

wherein "L" is either —O— or is —COO—; wherein "n" is either 0 or is an integer value of 1 to 3 inclusive; wherein "R" is either —H, $CH_3$, or —$C_2H_5$; wherein "y" is about 18 to about 60 mole percent; and wherein the sum of "$A_1$", "$A_2$", "y" and "z" is 100 mole percent.

2 Claims, No Drawings

FURNITURE POLISH CONCENTRATE AND FORMULATIONS

REFERENCE TO RELATED APPLICATION

This patent is a continuation-in-part of U.S. application Ser. No. 07/543,605 (now abandoned) filed 25 Jun. 1990, the benefit of which filing data is now claimed for priority purposes pursuant to 35 USC § 120, which application in turn is continuation-in-part of U.S. application Ser. No. 07/286,907, which was filed 20 Dec. 1988, and which is now U.S. Pat. No. 4,936,914 the benefit of which is now claimed for purposes of priority pursuant to 35 USC § 120.

TECHNICAL FIELD

One aspect of the present invention is directed to a furniture polish concentrate. Another aspect of the present invention is directed to furniture polish compositions that are formulated from such a concentrate. The furniture polish concentrate of the present invention comprises dimethyl silicone and a poly(dimethyl)-copoly(methyl, oxygen-containing) siloxane copolymer, the structure of which is described hereinbelow.

BACKGROUND ART

Most furniture has a lacquer coating or "film" on certain portions of the external surfaces thereof. Those skilled in the art well know that conventional furniture polishes form at least one additional film layer on top of the furniture lacquer coating or film. "Smearing" of a polished furniture surface occurs when a shearing force is applied to an area or region along the surface of the furniture polish film layer.

The ability of a polished furniture surface (i.e., the furniture polish film layer) to return to its original appearance after being smeared, and the amount of time required to return the furniture polish film layer to its original appearance, are two factors or parameters which tend to be rather important in the evaluation of the performance of any particular furniture polish composition or formulation. The term "smear recovery", as used herein, thus denotes not only the rate-of-recovery but also the ability of a "smeared" surface-applied furniture polish film to return to its original surface appearance.

Furniture polish compositions or formulations possessing superior smear recovery properties have long been desired. Commercially-available silicone-containing furniture polishes, however, and in particular the surface-applied films they produce, typically lack this particular quality. Indeed, many conventional dimethyl silicones tend to deposit films which exhibit "bronzing". (To exhibit "bronzing" is to exhibit a tendency to streak.) Moreover, dimethyl silicones, many of which are of a liquid nature, naturally tend to smear because of their liquid nature.

To reduce "bronzing", formulators of a number of presently commercially-available furniture polishes incorporate certain additives—such as waxes, oils and/or surfactants—into many of their dimethyl silicone-containing furniture polish formulations. The addition of such additives to a furniture polish formulation, however, often produces undesirable effects. For example, the addition of wax to such a polish formulation generally reduces the ability of the resultant polish film to exhibit total smear recovery; while the addition of oil and/or surfactant tends to make a smear more visible, which is generally undesirable.

It is, moreover, well known to those skilled in the art that certain light-reflectance properties of an applied polish film are dependent upon such physical characteristics as film thickness and film viscosity.

Depth-of-gloss, one such light-reflectance property, relates to the ability, for example, of a polished lacquered furniture surface to reflect light. In the case of the polished lacquered furniture surface, mentioned above, one particular depth-of-gloss value would become relatively more aesthetically pleasing to the eye in the event that a major portion of incident light rays should pass through the polish film (or films, if several) and through the lacquer, and thereafter should be reflected off of (or be absorbed by) the true or actual substrate surface, e.g. the actual wood-grained surface of the furniture.

Thus, high shine, one particular depth-of-gloss quality, is known to occur when relatively more light is reflected from the surface of a polish film; whereas rich appearance, another particular depth-of-gloss quality, is known to occur when relatively less light is reflected from such a surface.

Shearing forces applied to the surfaces of such polish films thus tend to give rise to certain surface disturbances, called "smears", which can be caused by such factors as the diffusion of reflected light rays, the exposure of the underlying substrate surface, and so forth.

It is also well known to those skilled in the art that polish films which tend to exhibit less depth-of-gloss (i.e., high shine) also tend to exhibit smears that are less readily visible. Depth-of-gloss is thus considered yet another particularly important performance parameter, when characterizing polish films.

Because of their particular optical properties, a number of presently commercially-available dimethyl silicones are utilized in furniture polish compositions, in lieu of such film-forming ingredients as waxes and/or surfactants and/or oils, for purposes of improving depth-of-gloss. However, and as was mentioned above, wax addition undesirably affects total smear recovery; and oil and/or surfactant addition undesirably affects smear visibility.

Thus, commercial furniture polishes that use conventional silicone-containing or conventional silicone-based fluids, as well as certain conventional waxes, surfactants and/or certain oils, seemingly initially tend to provide certain desirable surface-appearance values but, in fact, ultimately suffer from a variety of inherent disadvantages.

I have discovered, surprisingly, when a particular furniture polish concentrate comprises certain immiscible liquids, that a furniture polish composition formulated from such a concentrate can provide furniture surfaces with films that possess the depth-of-gloss qualities or values otherwise achieved through use of dimethyl silicone (which provides rich appearance), while maintaining some of the desirable smear-recovery properties, mentioned above, such as the exhibition of relatively less-visible smears (which are otherwise able to be provided by film-forming polish formulations consisting essentially of liquid ingredients only).

Briefly stated, I have discovered a furniture polish concentrate wherein at least three aspects of smear recovery, as thus defined, can now be controlled when the concentrate of the present invention is utilized in the manufacture of a furniture polish formulation. The three aspects referred to above are (1) the speed of smear recovery, (2) the overall visibility properties of any particular smear, and (3) the degree to which a smeared polish film recovers to its original state after being smeared.

One object of my invention, therefore, is to provide furniture polish concentrates and polish compositions for furniture and other similar household items, wherein such polish compositions exhibit improved smear-recovery qualities.

It is yet another object of my invention to provide furniture polish compositions and/or formulations which may be applied and removed with a minimum of effort, and which possess not only improved smear-recovery properties but also acceptable so-called "depth-of-gloss" characteristices as well.

The foregoing, as well as other objects, features and advantages of my invention will become more readily apparent to those skilled in the art upon reference to the following summary and detailed description.

SUMMARY DISCLOSURE OF INVENTION

I have discovered that furniture polish formulations providing films possessing these and other desirable properties can readily be manufactured from the furniture polish concentrate of the present invention. The furniture polish concentrate of the present invention comprises dimethyl silicone and a poly-(dimethyl)-copoly(methyl, oxygen-containing) siloxane copolymer, structurally depicted as

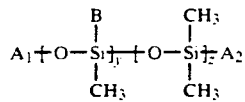

wherein "$A_1$" is Si—(—CH$_3$)$_3$; wherein "$A_2$" is O-Si-(—CH$_3$)$_3$; wherein "B" is (CH$_2$)$_i$(M)$_j$(L)(CH$_2$CH$_2$O)$_n$R; wherein "i" is either 0 or an integer value of 3 to 8 inclusive; wherein "j" is either 1 when "i" is 0 or is 0 when "i" is 3 to 8 inclusive; wherein "M" is

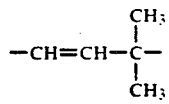

wherein "L" is either —O— or is —COO—; wherein "n" is either 0 or is an integer value of 1 to 3 inclusive; wherein "R" is either —H, CH$_3$, or —C$_2$H$_5$; wherein "y" is about 18 to about 60 mole percent; and wherein the sum of "$A_1$", "$A_2$", "y" and "z" is 100 mole percent.

INDUSTRIAL APPLICABILITY

The furniture polish concentrate of the present invention is specifically formulated for inclusion in or incorporation into film-forming polish compositions and/or formulations, for ultimate application to various household surfaces in general and furniture surfaces in particular. That is, such compositions or formulations are typically used for purposes of depositing liquid polish films onto furniture and other similar household items as well as a variety of other household surfaces. The concentrate of the present invention can thus be formulated into a wide assortment of creams, dispersions, emulsions and/or suspensions. Such compositions and/or formulations, moreover, can be contained in—or transported via—any industrial or commercial container of suitable size. Preferably, in this regard, certain formulations of the furniture polish concentrate of the present invention can readily be contained in a wide variety of commercially-available containers such as aerosol containers, bottles, screw-top jars, and so forth, each of suitable size. Furthermore, such compositions can otherwise be combined with other articles of manufacture. For example, furniture polish compositions formulated from the concentrate of my present invention can be impregnated into porous materials. (See, e.g., U.S. Pat. No. 3,965,518 to Muoio.)

BEST MODE FOR CARRYING OUT THE INVENTION

While my present invention is susceptible to embodiment in a variety of forms, there are hereinbelow described in detail several presently preferred embodiments, with the understanding that the present disclosure is to be considered as merely an exemplification of my present invention without limitation to the specific embodiments discussed.

As was mentioned above, one aspect of the present invention is directed to a furniture polish concentrate comprising dimethyl silicone and a poly-(dimethyl)-copoly(methyl, oxygen-containing) siloxane copolymer, preferably structurally depicted as

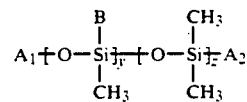

wherein "$A_1$" is Si—(—CH$_3$)$_3$; wherein "$A_2$" is O-Si-(—CH$_3$)$_3$; wherein "B" is (CH$_2$)$_i$(M)$_j$(L)(CH$_2$CH$_2$O)$_n$R; wherein "i" is either 0 or an integer value of 3 to 8 inclusive; wherein "j" is either 1 when "i" is 0 or is 0 when "i" is 3 to 8 inclusive; wherein "M" is

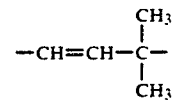

wherein "L" is either —O— or is —COO—; wherein "n" is either 0 or is an integer value of 1 to 3 inclusive; wherein "R" is either —H, CH$_3$, or —C$_2$H$_5$; wherein "y" is about 18 to about 60 mole percent; and wherein the sum of "$A_1$", "$A_2$", "y" and "z" is 100 mole percent.

Preferably "y" is about 20 to about 55 mole percent; and, more preferably, "y" is about 20 to about 50 mole percent.

Also, the siloxane copolymer has a greater specific gravity than the dimethyl silicone. Preferably, the siloxane copolymer has a specific gravity that is at least 0.001 times greater than the specific gravity of the dimethyl silicone.

Furthermore, the siloxane copolymer preferably has a relatively greater viscosity than the dimethyl silicone.

More generally, with reference to the siloxane copolymer, compatability with the dimethyl silicone ingredient of the concentrate, as well as certain other desirable physical properties necessary for exhibiting desirable smear-recovery qualities, can be achieved when the "$A_1$", "$A_2$", and/or "B" groups contain certain other oxygen-containing and/or phenyl-containing groups. Representative groups include >C=O; —O—; —OCH$_3$; —OCH$_2$CH$_2$—; —OCH$_2$CH$_2$CH$_3$; —C(-

=O)—O—; phenyl; and combinations thereof. To predict which films will provide superior smear-recovery characteristics, it has been my experience to incorporate into the siloxane copolymer certain of the above-noted representative groups, for purposes of affecting certain physical properties of the thus-produced siloxane copolymer. Such physical properties of the siloxane copolymer include refractive index, viscosity, compatibility with the furniture lacquer surface, and specific gravity relative to the dimethyl silicone.

Furthermore, still generally with reference to the siloxane copolymer I have found that the presence of a dimethyl siloxane portion on the molecule (i.e., the "y" portion of the molecule) seems to be important for two reasons, namely, for controlling the lowering of the refractive index of the siloxane copolymer, and for improving the wetting of the nitrocellulose substrate by the siloxane copolymer.

Throughout this patent application, I use the term "dimethyl silicone". A vast number of presently commercially-available dimethyl silicones, more technically referred to as "polydimethyl siloxanes" by certain individuals skilled in the art, are generally well known. In this regard, dimethyl silicones which are particularly suitable for purposes of my present invention are disclosed, for example, in U.S. Pat. No. 3,576,779 to to Holdstock et al.; see also, in particular, pages 258–265 of a catalog titled "Petrarch Systems, Silanes and Silicones", published 1987, by Petrarch Systems of Bristol, Pa.

In a particularly preferred embodiment of the siloxane copolymer, "B" is represented by the following structure

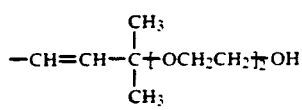

and the "y" value of the structure disclosed further hereinabove is 20 to 50 mole percent.

As was briefly mentioned above, another aspect or feature of the present invention is directed to a furniture polish composition that is formulated from the furniture polish concentrate of my invention. Still another aspect of the present invention is directed to an article of manufacture—such as a porous pad—which contains such a furniture polish formulation. Further aspects or features of the present invention will become readily more apparent to those skilled in the art upon reading the following disclosure.

Most furniture has a lacquer layer or film on at least a portion of the external surfaces thereof. Such a lacquer film typically has a refractive index of between about 1.49 and 1.53. Generally, the refractive index of such a lacquer film is about 1.50.

The furniture polish concentrate of the present invention comprises two mutually-immiscible film-forming liquids, namely the dimethyl silicone ingredient and the poly(dimethyl)-copoly(methyl, oxygen-containing) siloxane ingredient, both of which are liquids at room temperature (i.e., 25° C.). When the concentrate of the present invention is incorporated into a furniture polish composition or formulation, the two above-identified immiscible liquids form separate layers on the lacquered furniture surface. In particular, the dimethyl silicone forms the uppermost layer; the poly(dimethyl)-copoly(methyl, oxygen-containing) siloxane forms an intermediate layer; and the furniture lacquer layer defines the true or "actual" surface of the furniture. Thus, the poly(dimethyl)-copoly(methyl, oxygen-containing) siloxane possesses a relatively greater specific gravity than the dimethyl silicone. In particular, the specific gravity of the dimethyl silicone typically ranges between 0.90 and between 0.97.

I have discovered that furniture polish compositions possessing improved smear recovery qualities can readily be formulated when certain conditions exist for each of the above-identified mutually immiscible film-forming ingredients. Briefly stated, the viscosity and the refractive index values of the silicone and siloxane layers are of principal concern.

For example, I have observed that the speed of smear recovery can be enhanced by reducing the viscosity of the dimethyl silicone, which resides at the surface as the uppermost layer thereon. In addition, I have observed that the speed or rate of smear recovery can be enhanced by specifically selecting a particular siloxane copolymer so that the siloxane copolymer of the intermediate layer is relatively incompatible with the uppermost dimethyl silicone layer. That is, dimethyl silicone and siloxane copolymer, both liquids at room temperature, exhibit a tendency to naturally and readily separate into distinct layers. The result of such a tendency is a relatively more rapid recovery of the polish film into its layered structure after smearing.

I have also observed that the visibility of any particular smear tends to be noticeably more reduced when the dimethyl silicone and the siloxane copolymer ingredients possess similar refractive indexes. The intermixing of the two separate film layers, namely the silicone and the siloxane layers, during smearing thus tends to result in the production of a dispersion of these two components, which in turn causes incident light rays to be reflected diffusely from the interface of the thus-dispersed components. (It has been my observation, that furniture-polish formulations which incorporate additives—such as waxes, oils, and/or organic surfactants—typically tend to have high refractive index values.) Because the silicone and siloxane ingredients of the concentrate of my invention have similar refractive indexes, relatively very minor quantities of incident light rays are reflected off of the interface between these two ingredients.

I have further observed that the visibility of any particular smear can also be controlled so as to maximize the viscosity-difference value, as between the siloxane copolymer and the dimethyl siloxane, with the siloxane copolymer having the greater viscosity value, thereby making it relatively more difficult to displace the siloxane copolymer from the true or actual substrate surface during smearing, particularly during "hard" smearing. (The term "hard" smear connotes a significantly-greater-than-typical applied shearing force or other surface disturbance.) In other words, exposure of the true or actual substrate surface may very well result in a readily more visible smear mark due to the optical properties of the lacquer, which typically has a refractive index of about 1.50, being different from the refractive index value of the furniture polish film.

Refractive index values, reported herein, were determined using an Abbe type of refractometer, well known to those skilled in the art. Such a refractometer measures the refractive index of a liquid, such as the silicone and/or siloxane ingredients mentioned above. Each such measurement, moreover, was based upon the so-called sodium "D" line, which has a wavelength of 5893 nanometers.

Thus I have discovered, by maintaining certain physical properties of the dimethyl silicone and the siloxane copolymer liquid ingredients, that the concentrate of my present invention can be formulated into furniture polish compositions possessing highly-desirable smear recovery qualities.

In particular, the dimethyl silicone of the surface layer typically has a viscosity of about 5 centipoise ("cp") to about 1,000 cp. Preferably, the dimethyl silicone has a viscosity of no more than about 100 cp; and, more preferably, no more than about 50 cp.

Those skilled in the art well know that the term "poise" is the so-called "cgs" unit of viscosity; that one poise is equivalent to one-hundred (100) centipoise ("cp"); that the term "stoke" is the so-called "cgs" unit of kinematic viscosity; that one stoke is equivalent to one-hundred (100) centistokes ("cstks"); that the so-called "cgs" unit of density is expressed in grams per cubic centimeter; and that the viscosity value is equivalent to the product of the kinematic viscosity and the density values. That is, the density value, expressed in cgs units, is arrived at by multiplying the kinematic viscosity value, as expressed in cgs units, by the density value, also expressed in cgs units.

The above-identified siloxane, on the other hand, which is the intermediate layer, typically has a viscosity of between 100 and 5,000 cp. Preferably, the siloxane has a viscosity of between 400 and 4,000 cp; and, more preferably, the siloxane has a viscosity of between 2,500 and 3,000 cp.

As was mentioned above, the intermediate layer preferably has a relatively greater viscosity than the surface layer.

As was also mentioned above, another physical property that is important to maintain within controlled limits is the refractive index of each of the liquid dimethyl silicone and the liquid siloxane copolymer layers.

The liquid dimethyl silicone layer typically has a refractive index of between about 1.39 and about 1.40; and the above-identified liquid siloxane copolymer layer typically has a refractive index of between about 1.42 and about 1.46. Preferably, the siloxane copolymer has a refractive index of about 1.43 to about 1.45.

Typically, the furniture polish concentrates of my present invention are employed in furniture polish compositions or formulations in amounts ranging from about 0.5 to about 50 weight percent, based upon the total weight of a specified composition (exclusive of any propellant), with concentrations of about 1 to about 10 weight percent being preferred, and with concentrations of about 1 to about 5 weight percent being even more preferred.

The concentration of any particular furniture polish concentrate, utilized in such a specified composition, is not critical. Indeed, those skilled in the art can well appreciate that specific concentrate amounts will generally be dictated in accordance with the relative proportions of certain other ingredients which are included in a particular composition.

Such is also true of each of the other ingredients, which are utilized to formulate the various compositions that are illustrative of my present invention. That is, the concentrations of other ingredients, described in greater detail hereinbelow, are not critical and are given only to present preferred embodiments of my present invention.

The selection of optional ingredients for incorporation into any one layer, or all layers of the polish film is determined by the relative need of any such layer for additives, such as emulsifier, to make a particularly desired film. Emulsifier additives are selected, for example, based on such criteria as their ability to form an emulsion, their inherent inability to decrease the incompatible nature between the surface and sublayer film beyond desirable limits, and their effect on the overall viscosity, refractive index, and specific gravity of either layer. At this time I presently postulate that such thus-added emulsifiers or surfactants may either reside in the liquid dimethyl silicone layer, or in the liquid siloxane copolymer layer, or in both of these layers; or may reside in still another layer, such as in an interface layer between the two above-mentioned layers. In any event, I presently prefer all thus-added amounts of emulsifier to be minimal, so as to minimize the likelihood of experiencing undesirable effects during smear.

More particularly, the polish compositions of my present invention can be either oil-in-water (i.e. so-called "water out") emulsions or water-in-oil (i.e. so-called "oil out") emulsions. Those skilled in the art can readily choose an appropriate surfactant (or emulsifier), or combination of surfactants (or emulsifiers), to produced the desired type of emulsion.

As those skilled in the art can well appreciate, the term "emulsion" is generally recognized as connoting a stable mixture of two or more mutually immiscible liquids held in suspension by small percentages of substances called emulsifiers (or surfactants). All emulsions, moreover, are characterized as comprising a continuous phase and a discontinuous phase which is dispersed throughout the continuous phase.

The siloxane copolymer ingredient of the furniture polish concentrate of my present invention functions as an emulsifier. As a result, the furniture polish compositions of my present invention can be formulated as emulsions utilizing only the furniture polish concentrate of my present invention. However, for a variety of reasons, those skilled in the art may want to incorporate certain other emulsifiers or surfactants, into my furniture polish compositions, to achieve a particular desired result. Indeed, in certain ones of my below-presented examples which are illustrative of my present invention, I have not included certain optional surfactants, for purposes of illustrating the so-called "best mode" of my present invention.

Still more particularly, in the formulation of the various emulsion polish compositions of my present invention, the various solvents and optional surfactants described below are typically those conventionally used in furniture polish compositions. The critical component, insofar as the formulation of the furniture polish composition of the present invention is concerned, thus is only the furniture polish concentrate of the present invention.

In accordance with the principles of my present invention, suitable solvents include, in general, water, and the traditional hydrocarbon solvents which I will discuss in greater detail hereinbelow. However, as those skilled in the art well know, water would not be an acceptable solvent when the "L" structural value of the siloxane copolymer is —COO—, as undesired hydrolysis would result, unless precautions are taken to control the chemical nature (such as pH) of other ingredients.

In general, therefore, when the "L" structural value is —O—, traditional hydrocarbon solvents are typically, and in certain instances optionally, utilized in the formulation of the furniture polish compositions of my present invention. Those skilled in the art know full well that solvents are typically utilized in conventional polish compositions for purposes of removing solvent-soluble residues from substrate surfaces. For optimum results, therefore, any solvents that are utilized in preparing the emulsion polish compositions of this invention should be sufficiently volatile so as to bring about rapid drying after the composition has been applied to a substrate surface, and yet, not so volatile as to prematurely dry up before desired spreading of the composition onto the substrate surface (for purposes of providing a desired film) has taken place.

Accordingly, certain solvents deemed particularly useful, in accordance with the principles of my present invention, have so-called "kauri-butanol" values of from about 20 to about 50, and have boiling-point ranges of from about 60 degrees Celsius ("°C.") to about 210° C., and preferably from about 95° C. to about 150° C.

A wide variety of commercially-available isoparaffinic hydrocarbon solvents, such as those commercially available from the Exxon Corporation under the "Isopar" brand as well as the isoparaffinic-type hydrocarbon solvents commercially available from the Phillips Petroleum Corporation under the "Soltrols" brand, are moreover presently preferred because they are substantially odor-free.

Other suitable hydrocarbon solvents, in accordance with the principles of my present invention, include hexane, heptane and the so-called "Stoddard" solvents.

The various above-described hydrocarbon solvents, furthermore, can be utilized individually or in combination.

Any hydrocarbon solvent that is utilized can be present in amounts of from about 0.15 to about 90 weight percent, based on the total weight of the emulsion polish composition (excluding any propellant, if present). Preferably, however, such a hydrocarbon solvent will be present in an amount of from about 1.0 to about 25 percent, with about 5 to about 20 weight percent being even more preferred.

As was briefly mentioned above, all emulsions comprise a continuous phase and a discontinuous phase. While the amount of surfactant (or emulsifier) present in the emulsion polish compositions of my present invention is not critical, it is to be understood that the emulsion polish compositions of my present invention must include an amount of surfactant (or emulsifier), or an amount of combinations of surfactants (or emulsifiers), for effectively dispersing the discontinuous phase throughout the continuous phase. As I mentioned above, I have found the siloxane copolymer ingredient to be entirely acceptable, for purposes of achieving such a result. Other polish formulators (skilled in the art), however, may wish to incorporate optional surfactant.

Accordingly, optional surfactants (or emulsifiers) useful for purposes of my present invention include conventional non-ionic, cationic, and anionic surfactants (or emulsifiers) commonly employed in commercial polishes for application to furniture surfaces. Such conventional surfactants can be used alone or in combination.

Thus, in certain preferred embodiments of my present invention, certain conventional optional non-ionic surfactants, as well as certain combinations of conventional non-ionic surfactants, are optionally utilized because they provide certain desirable emulsion-stability properties. Conventional optional non-ionic surfactants (or emulsifiers), suitable for purposes of my present invention, accordingly include, but are not limited to, the so-called "sorbitan" esters of oleic and lauric acids; those polyethoxylated sorbitan esters having up to 20 ethoxy units; the monoglycerides and diglycerides of the fat-forming fatty acids; and combinations thereof.

Additional examples of optionally preferred, commercially-available non-ionic surfactants (or emulsifiers) include certain "Span" brand and "Tween" brand emulsifiers, both presently available from ICI Americas, Inc.; and the "Monamid" brand emulsifiers, presently available from Mona Industries, Inc. Particular examples of such emulsifiers include sorbitan monooleate, sold by ICI Americas, Inc., under the "SPAN 80" brand; sorbitan monolaurate, sold by ICI Americas, Inc., under the "SPAN 20" brand; and sorbitan monopalmitate, sold by ICI Americas, Inc., under the "SPAN 40" brand. Mixtures of the various above-mentioned optional surfactants (or emulsifiers) can also be utilized, if desired, in accordance with the principles of my present invention.

It is, accordingly, further presently believed that the following conventional cationic surfactants or emulsifiers would be suitable for purposes of my present invention. These include certain quaternary ammonium compounds such as the quaternary ammonium halides, the quaternary ammonium sulfates, those so-called "fatty" amines which are ethoxylated and have about 2 to about 10 moles of ethylene oxide, and the chloride salts or acetate salts of such amines, as well as those amines which are ethoxylated and have 2 or more moles of ethylene oxide. Various mixtures or combinations of the above-noted optional surfactants (or emulsifiers) can also be utilized by those skilled in the art, in accordance with the principles of my invention, if desired.

Conventional optional anionic surfactants or emulsifiers, suitable for purposes of my present invention, include certain sulfates (such as sodium lauryl sulfate and the sodium alkyl ether sulfates), those sulfosuccinates containing polyethylene glycol moieties attached thereto, as well as the alkyl aryl sulfonates. Mixtures of the above optional surfactants (or emulsifiers) can also be utilized, in accordance with the principles of my present invention, if desired.

The optional surfactants (or emulsifiers), mentioned above, can be present in the compositions of my present invention in amounts ranging from about 0 to about 10 weight percent, based on the total weight of my emulsion polish composition (exclusive of any propellant, if present), with from about 0.0 to about 1.0 weight percent being preferred. Because certain surfactants are highly polar, suitability of any particular surfactant (or amount thereof) for application to a lacquer surface will need to be determined, as certain such surfactants are known to occasionally damage lacquer surfaces.

Certain emulsion polish compositions of this invention may also contain water as the principal constituent of the emulsion, as was mentioned above, for example, when the "L" structure of the siloxane copolymer is —O—. The presence of water in such emulsion polish compositions of my invention has been observed to assist in the "leveling" of the resultant film of the emulsion polish composition, upon application of such a film to a substrate surface. The presence of water, moreover, tends to remove any water-soluble soil particles that may be present on the thus-treated substrate surface. Generally, water will therefore make up the balance of such water-containing emulsion polish compositions, taking into account the active ingredients noted above; and such balance amount of water is accordingly present in an amount ranging from about 2 to about 99 weight percent, based upon the total weight of the composition (exclusive of any propellant, if present), with concentrations of about 66 to about 93 weight percent being preferred.

As was implied above, the most preferred emulsion polish compositions of this invention are totally wax-free. However, it may be desirable, in certain situations, to utilize a relatively minor amount of wax in specific formulations. Thus, from about 0.05 to about 0.5 weight-percent wax, based upon total weight of the emulsion polish composition, may optionally be employed in the furniture polish compositions of my present invention. Conventional waxes, suitable for purposes of my invention, accordingly include, but are not limited to, certain synthetic waxes such as the microcrystalline waxes and the petroleum waxes as well as certain natural waxes such as the so-called "candellila" and "carnauba" waxes.

Still other well-known additives, including but not limited to perfumes and preservatives such as formaldehyde, may optionally be added to the emulsion polish compositions of my present invention.

Perfumes are typically added, for example, to impart a desired fragrance. Conventional perfumes, suitable for purposes of my present invention, are well known to those skilled in the art and accordingly need not be described in detail here. The amount of perfume which is included is typically present in an amount that is effective for imparting a desired fragrance intensity. Such an amount of perfume can range, for example, from about 0.05 to about 1 weight percent, based upon the total weight of the emulsion polish composition (exclusive of any propellant, if present).

Preservatives, typically formaldehyde, are generally utilized to retard or otherwise thwart undesired bacterial activity within packages containing certain formulations of the emulsion polish compositions of my present invention. As those skilled in the art can well appreciate, the presence of such preservatives is for prolonging the shelf life of the thus-formulated emulsion polish composition product. A variety of well-known conventional quaternary compounds can moreover be utilized for such a purpose.

Furthermore, the emulsion polish compositions of my present invention can be applied directly onto a substrate surface, utilizing e.g. a wide variety of well-known conventional pressurized systems containing an appropriate amount of a liquid or gaseous propellant. In particular, the emulsion polish compositions can be applied directly onto a substrate surface, utilizing well-known spray means such as conventional pump sprayers. Additionally, the emulsion polish compositions can be applied to furniture surfaces, utilizing a polishing cloth, or other suitable means. Still further, the furniture polish compositions can be incorporated into articles of manufacture—such as absorbent cloths—if desired. See, e.g., U.S. Pat. No. 3,965,518 to Muoio.

Moreover, as was briefly implied above, the emulsion polish compositions of my present invention can be provided in aerosol form. To produce such an aerosol form, the emulsion polish composition is typically introduced into a conventional aerosol container which is then capped with an aerosol valve. Thereafter, an effective amount of a suitable, conventional propellant is introduced into the aerosol container, in a known manner, for achieving a desired pressure in the container. Such propellant pressure should therefore be sufficient for enabling substantially complete expulsion of the aerosol container-contained ingredients, in the form of a spray in the desired manner, through the aerosol valve. Any of a wide variety of suitable conventional propellants which may be used include such well-known liquified hydrocarbons propellant gases as isobutane, n-butane and propane, and various mixtures of these. Additional illustrative propellants include, for example, carbon dioxide and/or nitrogen.

The aerosol form of the emulsion polish compositions of my present invention typically contain between about 5 and about 30 weight percent of propellant, based upon the total weight of the propellant-containing emulsion polish composition of the present invention. The weight percentage or concentration of optional propellant ingredient is not critical and thus can vary widely depending on the desired end use.

Moreover, the precise method of manufacturing the polish compositions of this invention is not critical. The order and/or manner of addition of the various emulsion polish composition ingredients, mentioned above, may accordingly generally be varied and typically will not affect the quality of a particular emulsion polish composition which is thus being formulated or produced. Conventional techniques for forming water-in-oil and oil-in-water emulsion polishes are accordingly typically used to produce the various embodiments of the emulsion polish compositions of my present invention.

The so-called "wax-free" emulsion polish composition embodiments of the present invention are prepared utilizing a known, so-called "cold-blend" process. For example, one conventional cold-blend processing method, suitable for purposes of my present invention, comprises charging the oil-phase ingredients (namely, for example, a suitable hydrocarbon solvent, the siloxane copolymer, and optional surfactant and fragrance ingredients, if present) into a vessel of suitable dimension, preferably equipped with agitation means, and thereafter mixing the oil-phase ingredients until a homogeneous blend is achieved. Water and any other aqueous-phase ingredients (e.g. preservative) may next be slowly added to the vessel, while maintaining a moderate degree or amount of agitation, to thereby produce the desired emulsion polish composition. If it is necessary to stabilize the thus-produced water-containing emulsion polish composition, the resulting composition can then e.g. be homogenized by passing such emulsion polish composition through a 3/64 inch diameter orifice, utilizing a 60 to 80 psig pressure drop across the orifice.

Wax, if a component of the emulsion polish composition of my present invention, should be incorporated into the oil-phase ingredients; and the resultant mixture may then be heated to a temperature sufficient to melt the wax and achieve a homogeneous mixture. After the addition of water and any other ingredients, the wax-containing composition may then either be cooled directly, utilizing commercial cooling means, or may be allowed to cool to room temperature (i.e. 25° C.) and may thereafter preferably be homogenized.

Still other aspects, advantages and features of my present invention will become apparent to those skilled in the art upon reviewing the following examples, which are illustrative and not intended to limit the scope of my present invention except as defined in the appended claims.

In the various below-presented examples, all proportions are by weight unless otherwise specified.

The siloxane copolymers of the various examples presented below are summarized in Tables I and II as follows.

TABLE I

Certain Values of Siloxane Copolymers of Examples 1–8

| Example No. | "i" | "j" | "n" | "L" | "R" | "y" |
|---|---|---|---|---|---|---|
| | Integer Values | | | Structural Values | | Mole % |
| 1 | 0 | 1 | 2 | O | H | 23 |
| 2 | 0 | 1 | 2 | O | H | 23 |
| 3 | 0 | 1 | 2 | O | H | 24 |
| 4 | 0 | 1 | 2 | O | H | 24 |
| 5 | 0 | 1 | 2 | O | H | 53 |
| 6 | 0 | 1 | 2 | O | H | 53 |
| 7 | 0 | 1 | 2 | O | H | 48 |
| 8 | 0 | 1 | 2 | O | H | 48 |

TABLE II

Certain Other Values of Siloxane Copolymers of Examples 1–8

| Example No. | Viscosity. cp | Refractive Index[a] | Specific Gravity |
|---|---|---|---|
| 1 | 408 | 1.4192 | 0.99 |
| 2 | 408 | 1.4192 | 0.99 |
| 3 | 1460 | 1.4197 | 0.997 |
| 4 | 1460 | 1.4197 | 0.997 |
| 5 | 461 | 1.4405 | 1.021 |
| 6 | 461 | 1.4405 | 1.021 |
| 7 | 5020 | 1.4378 | 1.024 |
| 8 | 5020 | 1.4378 | 1.024 |

Footnote:
[a]The indicated refractive indexes were determined at 5893 Angstroms ("A").

The compositional make-up of Examples 1–8, which are preferred embodiments of the furniture polish compositions that were formulated from the concentrate of my present invention, are summarized in Table III, below.

TABLE III

Furniture Polish Formulations

| Ingredients | Numbered Examples | |
|---|---|---|
| | Odd[b] | Even[c] |
| Siloxane Copolymer | 1.5 | 1.5 |
| 10 cstks DMS[d] | 4.5 | 0.0 |
| 50 cstks DMS[e] | 0.0 | 4.5 |
| Isopar C[f] | 20.0 | 20.0 |
| CH$_2$O[g] | 0.2 | 0.2 |
| H$_2$O[h] | 73.8 | 73.8 |

TABLE III-continued

Furniture Polish Formulations

| Ingredients | Numbered Examples | |
|---|---|---|
| | Odd[b] | Even[c] |

Footnotes:
[b]The various ingredients of the "odd" numbered examples — namely Examples 1, 3, 5 and 7 — are tabulated in parts-by-weight.
[c]The various ingredients of the "even" numbered examples — namely Examples 2, 4, 6 and 8 — are also tabulated in parts-by-weight.
[d]Dimethyl Siloxane ("DMS") having a viscosity of 10 centistokes ("cstks") together with the siloxane copolymer tabulated above constituted the concentrate.
[e]Dimethyl Siloxane ("DMS") having a visocity of 50 centistokes ("cstks") together with the tabulated siloxane copolymer constituted the concentrate.
[f]"ISOPAR", a registered trademark of the Exxon Company of Houston, Texas, is representative of a line of synthetically-produced isoparaffinic solvents. Those skilled in the art are well aware of such Exxon isoparaffin solvents as "Isopar C", "Isopar E", "Isopar G", "Isopar H", "Isopar K", "Isopar L", and "Isopar M". (See, e.g., page 2 of "Lubetext DG-1P", published 1983, by the Exxon Company of Houston, Texas.)
[g]Formaldehyde ("CH$_2$O"), which constituted 37 weight percent formaldehyde in water, was utilized in the make-up of the furniture polish formulation as a biocide.
[h]Tap water was used.

Two conventional furniture polish formulations, set forth in Table IV below, were prepared for comparison purposes.

TABLE IV

Conventional Furniture Polish Formulations

| Ingredient | "D" | "E" |
|---|---|---|
| | Comparative Examples | |
| Span 80 | 0.50 | 0.50 |
| 10 cstks DMS | 5.50 | 0.00 |
| 50 cstks DMS | 0.00 | 5.50 |
| Micro-wax[k] | 0.30 | 0.30 |
| Paraffin[l] | 0.15 | 0.15 |
| Isopar C | 20.00 | 20.00 |
| CH$_2$O | 0.20 | 0.20 |
| H$_2$O | 73.35 | 73.35 |

[k]The above-tabulated micro-wax ingredient, presently commercially available from Petrolite of Tulsa, Oklahoma, was observed to have a melting point of about 150–160° F. A micro-wax ingredient is typically utilized to "anchor" the furniture polish formulation onto a particular substrate surface. In the formulations of my invention, the siloxane copolymer ingredient serves such a "film-anchoring" function, and a micro-wax ingredient was not included.
[l]Refined paraffin, presently commerically available from Shell Chemical Company of Houston, Texas, was observed to have a melting point of about 132–134° F. Refined paraffin is also typically incorporated into conventional furniture polish formulations to "anchor" the polish film to the substrate surface.

Formulation Procedure of Table III Examples

The formulations identified in Table III, above, were prepared as follows.

All siloxane copolymer disclosed herein was obtained from the General Electric Company, having its silicone products division at Waterford, N.Y.

Each of the tabulated furniture polish formulations was prepared by weighing out 1.9 grams of siloxane copolymer, 5.6 grams of dimethyl silicone, and 25.0 grams of "Isopar C" solvent, all at room temperature (i.e., 25° C.). These ingredients were then introduced into a 9-ounce commercially-available screw-top glass jar, and thereafter stirred with a conventional laboratory stirrer, at room temperature, until a uniform mixture was obtained. Next, the above-indicated proportions of formaldehyde and water were weighed out into a beaker and thereafter slowly added to the jar-contained mixture, while continuing stirring of the jar contents, to produce a water-in-oil emulsion. Next, 80 grams of the thus-produced water-in-oil emulsion were weighed out and thereafter introduced into a conventional aerosol container having a volume of 162 milliliters. The aerosol container was then pressurized with about 8.77 to about 8.98 grams of a commercially-available propellant, to provide a propellant-containing formulation having a pressure of about 27 to about 32 pounds per square inch gauge ("psig") at 70 degrees Fahrenheit ("°F."). The propellant utilized consisted of 34 weight percent propane, 26 weight percent isobutane, and 40 weight percent n-butane. For the aerosol container, a suitable commercially-available spray button was selected, for purposes of enabling the propellant-containing furniture polish formulation to provide spray characteristics that would be similar to commercially-available furniture polish formulations.

Formulation Procedure of Table IV Examples

The formulations identified in Table IV, above, were prepared as follows.

Each of the tabulated conventional furniture polish formulations was prepared by weighing out 2 grams of "Span 80" (brand) surfactant, 22 grams of dimethyl silicone, 1.2 grams of micro-wax, 0.6 grams of refined paraffin, and 80 grams of "Isopar C" solvent into a 1000-milliliter stainless steel beaker, and heating the stainless steel beaker contents to a temperature of about 150°–160° F. until the wax melted. The stainless steel beaker contents were then mixed, while maintaining elevated temperature, to produce a uniform mixture. Thereafter, water at ambient temperature (i.e., about 68°–75° F.) and formaldehyde ("CH$_2$O") were introduced into a separate beaker and similarly mixed until uniform. Upon becoming uniform, the aqueous CH$_2$O mixture was slowly added to the stainless steel beaker contents, still being maintained at elevated temperature, while agitating vigorously with a conventional laboratory stirrer, to produce a uniform water-in-oil emulsion. The thus-produced emulsion was then cooled, utilizing a conventional water bath, to about 74° F.

Evaluation Of The Smear Properties Of The Various Formulations

Ten (10) test panels, each measuring about five (5) and three-quarter (¾) inches by about eight (8) and three-quarter (¾) inches, were obtained. Each test panel consisted of a smooth, black "FORMICA" (brand) plastic material onto which a conventional high-gloss nitrocellulose furniture finish had been applied. (The word "FORMICA" is occasionally used—albeit improperly—as a generic term for high-pressure laminated sheets of melamine and phenolic plastics for decorative applications as surfacing; insulating material; adhesives for bonding laminated plastic to other surfaces; flakeboard for use as corestock with laminated plastic; and industrial plastics using various thermosetting resins, combined with various base materials for electrical, mechanical and chemical applications. The correct use of the word "FORMICA", however, recognizes that "FORMICA" is a trademark of the Formica Corporation, which is a subsidiary of the American Cyanamid Company of Cincinnati, Ohio.)

Onto each one of the ten (10) test panels, a corresponding one of the ten (10) different furniture polish formulations were twice applied. (The 10 different furniture polish formulations constituted Examples 1–8, representative of my invention, and Examples "D" and "E", representative of certain prior-art furniture polish formulations, all discussed above.) Thereafter, procedures, well known to those skilled in the art, were undertaken to assure effective evaporation of the water and "Isopar C" solvent from each formulation-applied test panel. (In particular, my preferred procedure is to insert each such formulation-applied test panel into a pre-formed well of a larger conventional test panel for purposes of providing an 18-inch by 27-inch polishing area.)

As soon as each such test panel-applied furniture polish formulation appeared to have no further amounts of water and "Isopar C" solvent evaporating therefrom, which was about 5 minutes after application of the furniture polish formulation, each such test panel was placed on a conventional smear-measuring device. (The smear-measuring device which I used, and which is referred to as a "9281 B Measurement Platform", is commercially-available from the Kistler Instrument Company of Amherst, N.Y.)

Procedure For Determining Finger And Knuckle Smear

Each such test panel-applied furniture polish formulation was smeared with a finger and with a knuckle, four (4) times, with downward pressure, which varied between about 0.15 Newtons and about 1.0 Newtons. (One "Newton" is equivalent to 0.2248 pounds of force.)

Each such finger smear was about one-half (½) of an inch wide; and each such knuckle smear was about three-sixteenths (3/16) of an inch wide.

Each such thus-smeared test panel-applied furniture polish formulation was then evaluated for initial visibility-of-smear as well as for visibility-of-smear after 20–26 hours of film aging.

The degree-of-smear was visually rated using the following 0-to-8 point scale.

TABLE V

| Numerical Value | Degree-Of-Smear Rating |
|---|---|
| | Observations & Other Comments |
| 0 | No visible smear. |
| 1 | Very slight trace of original smear; and otherwise very difficult to see. |
| 2 | Very slightly visible smear. |
| 3 | Slight smear. |
| 4 | Relatively easier to see the "slight smear" of 3. |
| 5 | Slight-to-moderate smear. |
| 6 | Moderate smear. Film still intact; but smear plainly visible. |
| 7 | Severe smear. Part of film may become removed from surface. |
| 8 | Very severe smear. Film totally removed from surface. |

Procedure for Determining Smear Recovery

The procedure for determining the smear recovery of transparent thin films is as follows.

A Murakami brand, model GP-1R, commercially-available Goniophotometer, specifically outfitted with a solenoid-driven swing arm was utilized. Attached to the swing arm was a ⅜ inch-wide smear medium. The smear medium consisted of a plurality of contacting, parallel strands of either 220 or 300-to 325 micron-diameter commercially-available monofilament line. Each such strand comprised an elongated, generally linear portion and a unitary, generally "C"-shaped portion at one end of the linear strand. Each such monofilament line strand was generally disposed, relative to a test substrate coupon, such that the generally linear strand portion was generally perpendicular to the test substrate while the curved portion of the monofilament strand rested on the surface of the test substrate.

Thus, the curved portion of each such strand of the plurality was disposed such that the curved portion of each such filament came into contact with the substrate, thereby to assure substantially complete contact of the plural strands over the test substrate area being smeared.

Each test substrate consisted of a 2.25-inch by 2.25-inch square of ⅛ inch-thick pieces of clear glass having a refractive index of about 1.50 to 1.52. It is important, for this procedure, that the lacquer and the glass have refractive index values that are about the same. Each such clear piece of glass, moreover, was coated with 1.25 grams of high-gloss nitrocellulose-containing furniture lacquer. Such lacquer included about 21.3 wt.-% non-volatile material. The glass-applied lacquer was cured slowly under a watch glass on a level surface, thereby to assure a smooth uniform finish on the piece of glass. The back of each such glass test slide was thus coated with a black lacquer to eliminate reflection from that surface. The lacquer-applied side of each such piece of glass had a refractive index of between 1.50 and 1.53.

Each such glass slide, thus-coated, was weighed on a conventional analytical balance capable of weighing to 0.10 milligrams, before inserting into a 19-inch by 17-inch furniture panel. Each slide-and-panel assembly was thereafter polished twice with a corresponding one of the ten (10) furniture polish formulations, utilizing a soft cloth. The weight of each such thus-treated glass slide was determined via analytical balance, for determining (by difference) the weight of each such thus-deposited polish film. The thickness of the thus-deposited polish film was then determined mathematically.

Thus treated, each test slide was inserted into the specimen holder of the Goniophotometer; and the 15 degree incident specular reflectance of the test surface was then measured directly. The solenoid-driven arm was activated to smear the test film. Such smearing resulted in a decrease in specular reflection of the test film. The specular reflectance of the film was monitored as a function of time to determine the percentage of original reflection at 0.25 and 158 seconds.

TABLE VI

| | | Goniophotometer Readings | |
| | | Percentage of Reflection Recovery | |
| Example No. | Film Thickness | 0.25 Seconds After Smearing | 158 Seconds After Smearing |
| --- | --- | --- | --- |
| 1 | 1261 A | 102 | 100 |
| 2 | 1671 A | 94 | 101 |
| 3 | 2835 A | 88 | 103 |
| 4 | 1766 A | 91 | 99 |
| 5 | 1892 A | 102 | 99 |
| 6 | 1419 A | 101 | 100 |
| 7 | 1923 A | 95 | 100 |
| 8 | 2144 A | 88 | 98 |
| "D" | 2838 A | 89 | 94 |
| "E" | 2966 A | 87 | 97 |

TABLE VII

Comparison of Finger-Smeared Low-Viscosity Formulations

| | Example Numbers | | | | |
| --- | --- | --- | --- | --- | --- |
| | 1 | 3 | 5 | 7 | "D" |
| Amount Applied | | | | | |
| Grams[p] | 6.54 | 6.51 | 6.58 | 5.59 | 6.1 |
| First Smear Values | | | | | |
| Smear Force[q] | .33426 | .25855 | .21433 | .42188 | .3053 |
| Smear Time[r] | 780 | 770 | 600 | 580 | 510 |
| Initial Smear Severity | 8 | 6 | 6 | 3 | 7 |
| Smear Severity After 20-26 Hours | 2 | 1 | 0 | 1 | 3 |
| Second Smear Values | | | | | |
| Smear Force | .65706 | .68486 | .45037 | 1.9439 | .7892 |
| Smear Time | 710 | 660 | 620 | 670 | 640 |
| Initial Smear Severity | 8 | 6 | 6 | 3 | 7 |
| Smear Severity After 20-26 Hours | 3 | 3 | 0 | 1 | 6 |
| Third Smear Values | | | | | |
| Smear Force | 1.1093 | 1.0517 | .87191 | .92114 | 1.1995 |
| Smear Time | 680 | 670 | — | 700 | 600 |
| Initial Smear Severity | 8 | 6 | 6 | 3 | 8 |
| Smear Severity After 20-26 Hours | 3 | 6 | 1 | 1 | 6 |
| Fourth Smear Values | | | | | |
| Smear Force | 1.5466 | 1.5087 | 1.4702 | 1.407 | 1.7531 |
| Smear Time | 720 | 710 | 660 | 770 | 580 |
| Initial Smear Severity | 8 | 6 | 6 | 3 | 8 |
| Smear Severity After 20-26 Hours | 6 | 6 | 1 | 2 | 7 |

Footnotes:
[p]The sprayed quantity of furniture polish composition indicated, expressed in grams, was a total of two (2) coats.
[q]Shear force is measured in Newtons.
[r]Shear time is measured in milliseconds.

TABLE VIII

Summary of Low-Viscosity Formulation Comparisons

| | Example Numbers | | | | |
| --- | --- | --- | --- | --- | --- |
| Summary Values | 1 | 3 | 5 | 7 | "D" |
| Sum of Fresh Smear Severities | 32 | 24 | 24 | 12 | 30 |
| Sum of 20-26 Hour Aged Smear Severities | 14 | 16 | 2 | 5 | 22 |
| Total Sum of Above Two Values | 46 | 40 | 26 | 17 | 52 |

TABLE IX

Comparison of Finger-Smeared High-Viscosity Formulations

| | Example Numbers | | | | |
|---|---|---|---|---|---|
| | 2 | 4 | 6 | 8 | "E" |
| Amount Applied | | | | | |
| Grams[p] | 6.45 | 6.78 | 7.26 | 6.76 | 5.95 |
| First Smear Values | | | | | |
| Smear Force[q] | .25898 | .23411 | .27731 | .28814 | .1524 |
| Smear Time[r] | 790 | 640 | 640 | 380 | 630 |
| Initial Smear Severity | 6 | 6 | 5 | 3 | 6 |
| Smear Severity After 20–26 Hours | 3 | 3 | 1 | 1 | 3 |
| Second Smear Values | | | | | |
| Smear Force | .51529 | .54889 | .41392 | .45949 | .3028 |
| Smear Time | 670 | 710 | 610 | 520 | 680 |
| Initial Smear Severity | 6 | 6 | 5 | 3 | 6 |
| Smear Severity After 20–26 Hours | 6 | 5 | 1 | 1 | 5 |
| Third Smear Values | | | | | |
| Smear Force | .87674 | .90135 | .72299 | .61183 | .6034 |
| Smear Time | 680 | 720 | 560 | 510 | 680 |
| Initial Smear Severity | 6 | 6 | 5 | 3 | 6 |
| Smear Severity After 20–26 Hours | 6 | 7 | 2 | 3 | 7 |
| Fourth Smear Values | | | | | |
| Smear Force | 1.4159 | 1.5712 | 1.1732 | 1.0042 | 1.0409 |
| Smear Time | 790 | 770 | 650 | 540 | 650 |
| Initial Smear Severity | 6 | 6 | 5 | 3 | 6 |
| Smear Severity After 20–26 Hours | 7 | 7 | 2 | 3 | 7 |

TABLE X

Summary of High-Viscosity Formulation Comparisons

| | Example Numbers | | | | |
|---|---|---|---|---|---|
| Summary Values | 2 | 4 | 6 | 8 | "E" |
| Sum of Fresh Smear Severities | 24 | 24 | 20 | 12 | 24 |
| Sum of 20–26 Hour Aged Smear Severities | 22 | 21 | 6 | 6 | 21 |
| Total Sum of Above Two Values | 46 | 45 | 26 | 18 | 45 |

TABLE XI

Comparison of Knuckle-Smeared Low-Viscosity Formulations

| | Example Numbers | | | | |
|---|---|---|---|---|---|
| | 1 | 3 | 5 | 7 | "D" |
| Amount Applied | | | | | |
| Grams[p] | 6.54 | 6.51 | 6.58 | 5.59 | 6.1 |
| First Smear Values | | | | | |
| Smear Force[q] | .33426 | .25855 | .21433 | .42188 | .3053 |
| Smear Time[r] | 780 | 770 | 600 | 580 | 510 |
| Initial Smear Severity | 8 | 6 | 6 | 3 | 7 |
| Smear Severity After 20–26 Hours | 2 | 1 | 0 | 1 | 3 |
| Second Smear Values | | | | | |
| Smear Force | .65706 | .68486 | .45037 | 1.9439 | .7892 |
| Smear Time | 710 | 660 | 620 | 670 | 640 |
| Initial Smear Severity | 8 | 6 | 6 | 3 | 7 |
| Smear Severity After 20–26 Hours | 3 | 3 | 0 | 1 | 6 |
| Third Smear Values | | | | | |
| Smear Force | 1.1093 | 1.0517 | .87191 | .92114 | 1.1995 |
| Smear Time | 680 | 670 | — | 700 | 600 |
| Initial Smear Severity | 8 | 6 | 6 | 3 | 8 |
| Smear Severity After 20–26 Hours | 3 | 6 | 1 | 1 | 6 |
| Fourth Smear Values | | | | | |
| Smear Force | 1.5466 | 1.5087 | 1.4702 | 1.407 | 1.7531 |
| Smear Time | 720 | 710 | 660 | 770 | 580 |
| Initial Smear Severity | 8 | 6 | 6 | 3 | 8 |
| Smear Severity After 20–26 Hours | 6 | 6 | 1 | 2 | 7 |

TABLE XII

Summary of Low-Viscosity Formulation Comparisons

| Summary Values | Example Numbers | | | | |
|---|---|---|---|---|---|
| | 1 | 3 | 5 | 7 | "D" |
| Sum of Fresh Smear Severities | 32 | 24 | 24 | 12 | 30 |
| Sum of 20-26 Hour Aged Smear Severities | 14 | 16 | 2 | 5 | 22 |
| Total Sum of Above Two Values | 46 | 40 | 26 | 17 | 52 |

TABLE XIII

Comparison of Knuckle-Smeared High-Viscosity Formulations

| | Example Numbers | | | | |
|---|---|---|---|---|---|
| | 2 | 4 | 6 | 8 | "E" |
| Amount Applied | | | | | |
| Grams$^p$ | 6.54 | 6.51 | 6.58 | 5.59 | 6.1 |
| First Smear Values | | | | | |
| Smear Force$^q$ | .33426 | .25855 | .21433 | .42188 | .3053 |
| Smear Time$^r$ | 780 | 770 | 600 | 580 | 510 |
| Initial Smear Severity | 8 | 6 | 6 | 3 | 7 |
| Smear Severity After 20-26 Hours | 2 | 1 | 0 | 1 | 3 |
| Second Smear Values | | | | | |
| Smear Force | .65706 | .68486 | .45037 | 1.9439 | .7892 |
| Smear Time | 710 | 660 | 620 | 670 | 640 |
| Initial Smear Severity | 8 | 6 | 6 | 3 | 7 |
| Smear Severity After 20-26 Hours | 3 | 3 | 0 | 1 | 6 |
| Third Smear Values | | | | | |
| Smear Force | 1.1093 | 1.0517 | .87191 | .92114 | 1.1995 |
| Smear Time | 680 | 670 | — | 700 | 600 |
| Initial Smear Severity | 8 | 6 | 6 | 3 | 8 |
| Smear Severity After 20-26 Hours | 3 | 6 | 1 | 1 | 6 |
| Fourth Smear Values | | | | | |
| Smear Force | 1.5466 | 1.5087 | 1.4702 | 1.407 | 1.7531 |
| Smear Time | 720 | 710 | 660 | 770 | 580 |
| Initial Smear Severity | 8 | 6 | 6 | 3 | 8 |
| Smear Severity After 20-26 Hours | 6 | 6 | 1 | 2 | 7 |

TABLE XIV

Summary of High-Viscosity Formulation Comparisons

| Summary Values | Example Numbers | | | | |
|---|---|---|---|---|---|
| | 1 | 3 | 5 | 7 | "D" |
| Sum of Fresh Smear Severities | 32 | 24 | 24 | 12 | 30 |
| Sum of 20-26 Hour Aged Smear Severities | 14 | 16 | 2 | 5 | 22 |
| Total Sum of Above Two Values | 46 | 40 | 26 | 17 | 52 |

The above-discussed low-viscosity formulations were made from 10 centistokes ("cstks") dimethyl siloxane ("DMS") purchased from Dow Corning, and known as "Dow Corning 200 Fluid". The above-discussed high viscosity formulations were made from 50 cstks. DMS, purchased from Petrarch Systems, Inc., and known as "PS040".

What has been disclosed herein is a novel furniture polish concentrate. While the concentrate of my invention has been described with reference to preferred embodiments or examples, it is to be understood that my invention is not to be limited to such. On the contrary, various alternatives, changes, and modifications will become apparent to those skilled in the art upon reading the foregoing description. Accordingly, such alternatives, changes and modifications are to be considered as forming a part of my invention insofar as they fall within the spirit and scope of the appended claims.

I claim:

1. A furniture polish concentrate consisting essentially of dimethyl silicone and a poly(dimethyl)-co-poly(methyl, oxygen-containing) siloxane copolymer, structurally depicted as

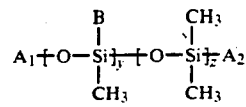

wherein "$A_1$" is Si-$(CH_3)_3$; wherein "$A_2$" is O-Si-$(-CH_3)_3$; wherein "B" is $(CH_2)_i(M)_j(L)(CH_2CH_2O)_nR$; wherein "i" is either 0 or an integer value of 3 to 8 inclusive; wherein "j" is either 1 when "i" is 0 or is 0 when "i" is 3 to 8 inclusive; wherein "M" is

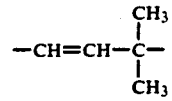

wherein "L" is either —O— or is —COO—; wherein "n" is either 0 or is an integer value of 1 to 3 inclusive; wherein "R" is either —H, $CH_3$, —$C_2H_5$; wherein "y" is about 18 to about 60 mole percent; and wherein the sum of "$A_1$", "$A_2$", "y" and "z" is 100 mole percent, wherein the siloxane copolymer and the dimethyl silicone are immiscible, wherein the siloxane copolymer possesses a relatively greater specific gravity than the dimethyl silicone, and wherein the siloxane copolymer has a greater refractive index than the dimethyl silicone.

2. A furniture polish composition comprising dimethyl silicone and a poly-(dimethyl)-co-poly(methyl, oxygen-containing) siloxane copolymer, structurally depicted as

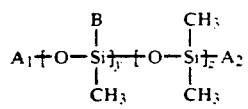

wherein "$A_1$" is Si—(—CH$_3$)$_3$; wherein "$A_2$" is O—Si—(—CH$_3$)$_3$; wherein "B" is (CH$_2$)$_i$(M)$_j$(L)(CH$_2$CH$_2$O)$_n$R; wherein "i" is either 0 or an integer value of 3 to 8 inclusive; wherein "j" is either 1 when "i" is 0 or is 0 when "i" is 3 to 8 inclusive; wherein "M" is

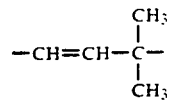

wherein "L" is either —O— or is —COO—; wherein "n" is either 0 or is an integer value of 1 to 3 inclusive; wherein "R" is either —H, CH$_3$, or —C$_2$H$_5$; wherein "y" is about 18 to about 60 mole percent; and wherein the sum of "$A_1$", "$A_2$", "y" and "z" is 100 mole percent, wherein the siloxane copolymer and the dimethyl silicone are immiscible, wherein the siloxane copolymer possesses a relatively greater specific gravity than the dimethyl silicone, and wherein the siloxane copolymer has a greater refractive index than the dimethyl silicone.

* * * * *